March 13, 1951      E. L. HINDMAN      2,544,788

MULTIPLE CONTACT SELECTOR SWITCH

Filed Sept. 8, 1948      2 Sheets-Sheet 1

Earl L. Hindman
INVENTOR.

BY *Clarence A. O'Brien*
*and Harvey B. Jacobson*
Attorneys

March 13, 1951   E. L. HINDMAN   2,544,788
MULTIPLE CONTACT SELECTOR SWITCH
Filed Sept. 8, 1948   2 Sheets-Sheet 2
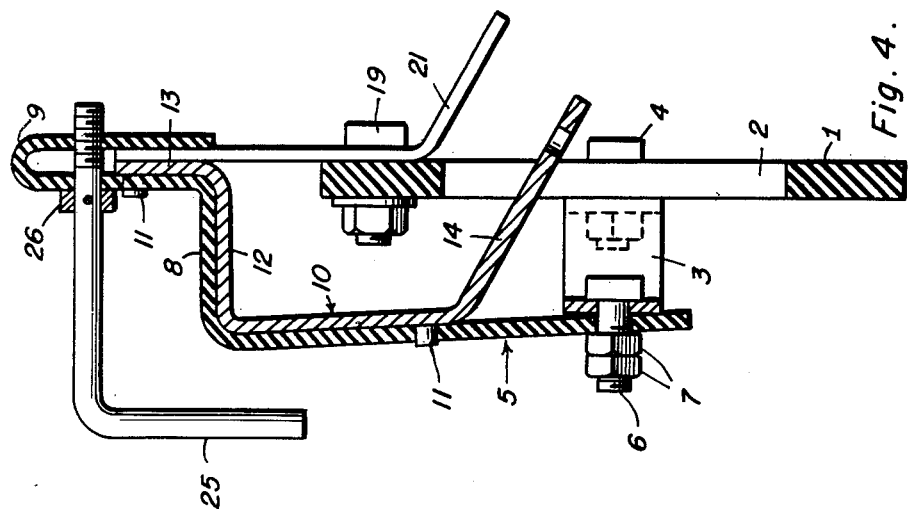
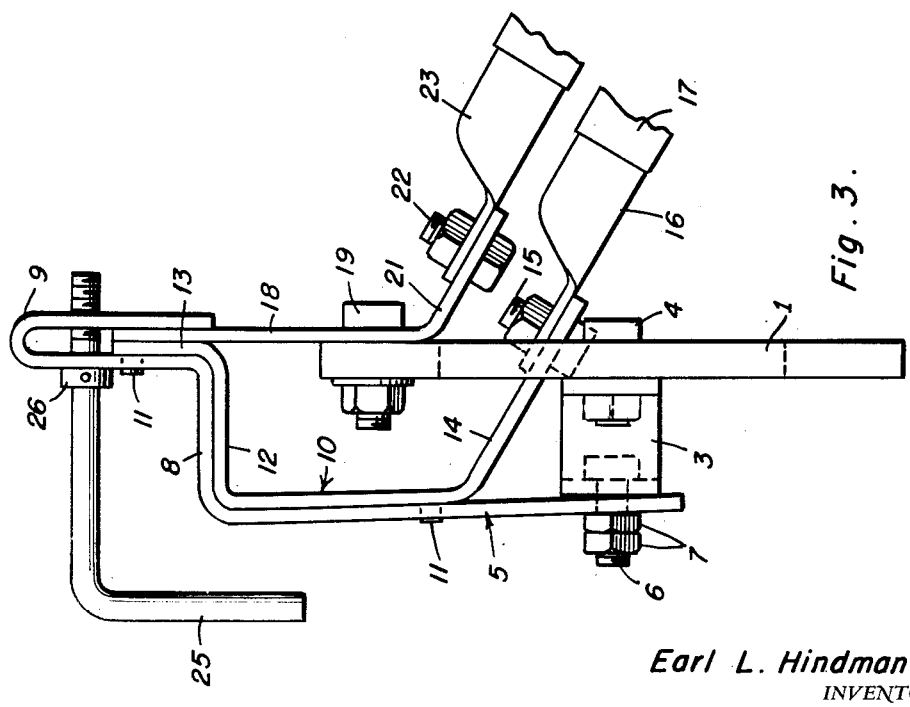
Earl L. Hindman
INVENTOR.

Patented Mar. 13, 1951

2,544,788

UNITED STATES PATENT OFFICE 2,544,788

MULTIPLE CONTACT SELECTOR SWITCH

Earl L. Hindman, Lowell, Ariz.

Application September 8, 1948, Serial No. 48,207

4 Claims. (Cl. 200—6)

My invention relates to improvements in multiple contact selector switches for use especially, although not necessarily, in electric arc welding machines.

In such machines, the amperage controls frequently burn out because of poor construction, and poor electrical connections resulting from slight wear between parts, and continuous welding cannot be accomplished with variations in amperage in the circuit to the welding tool.

With the foregoing in mind, the primary object of my invention is to provide a durable, dependable switch for selective amperage control in the circuit from the generator of such a welding machine to the welding tool, and which provides for continuous welding with variations in amperage in the circuit, is adapted to provide good electrical contact at all times, and without the use of springs.

Other and subordinate objects, within the purview of my invention, together with the precise nature of my improvements will be readily understood when the succeeding description and claims are read with reference to the drawings accompanying and forming a part of this specification.

In said drawing:

Figure 3 is a view in side elevation;

Figure 4 is a view in vertical section taken on the line 4—4 of Figure 1.

Figure 2:
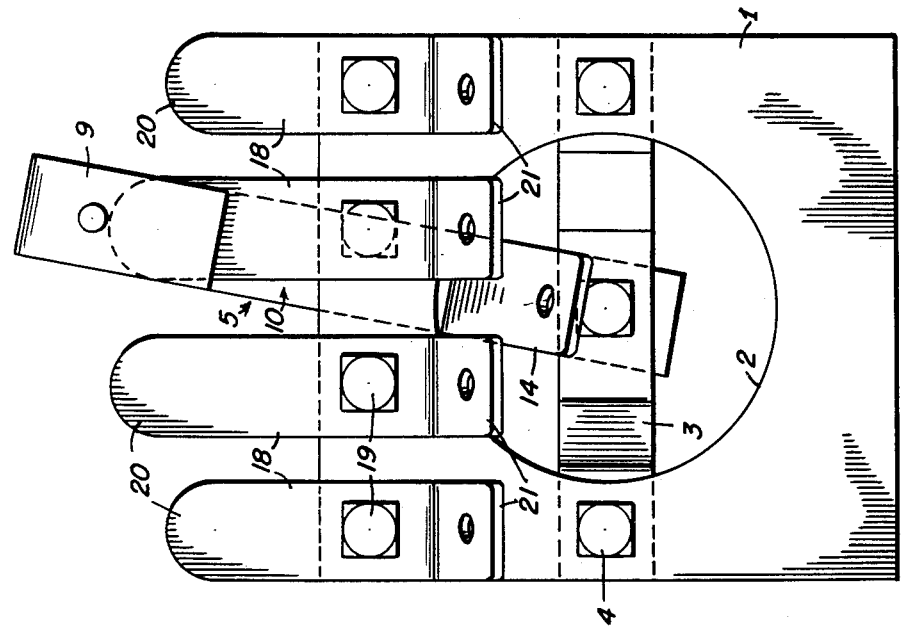
Figure 2 is a view in rear elevation of the same.
Figure 1:
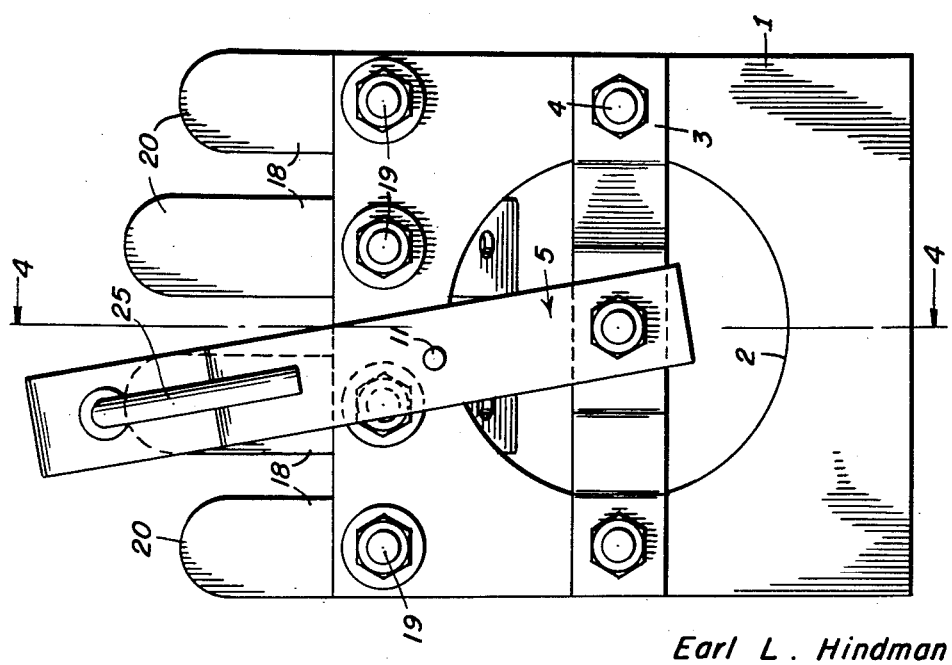
Figure 1 is a view in front elevation of my improved selector switch in the preferred embodiment thereof.

Referring to the drawings by numerals, my improved selector switch, as shown, comprises a base panel 1 of any suitable insulation fiber material and which is rectangular in form, preferably, and provided with a central circular opening 2 therein. The panel 1 is designed to be secured in any suitable manner upright on a part of an electric arc welding machine, not shown.

A bracket bar 3 of insulation material extends across the front side of the panel 1 horizontally and diametrically of the opening 2 with ends bolted to said panel 1, as at 4, said bracket bar arching across said opening.

A selector arm 5 of resilient insulation material and bar-like form is pivoted at a lower end thereof on the bracket bar 3 by a bolt 6 with lock nuts 7 on said bolt, said arm 5 extending upwardly in front of said panel 1 with a right angled upper end 8 extending beyond the upper edge of said panel 1 and formed with a flat terminal loop 9.

A contact bar member 10 of copper extends along and is suitably secured, as by studs 11, to the rear side of the selector arm 5 above the bracket bar 3 and is shaped to provide an upper end 12 fitting the right angled end 7 of said arm 5 and having a flat terminal 13 fitting part way into the terminal loop 9 at one side of said loop. The contact member 10 has an angular lower end 14 extending rearwardly through the opening 2 and to which is bolted, as at 15, the terminal end 16 of an electric conductor cable 17 for connection to the welding tool of the welding machine.

A series of contact bars 18 of copper, preferably, are bolted, as at 19, to the rear side of the panel 1 adjacent the upper edge of said panel to extend parallel, edge to edge, in equidistantly spaced relation upwardly of said edge of the panel 1 and with rounded upper tips 20 arranged in the arc of a circle concentric to the pivotal axis of the selector arm 5 and for straddling by the terminal loop 9 with the terminal 13 of the contact bar member 10 adapted to engage one side of said tips. The contact bars 18 are provided with angular lower ends 21 to which are bolted, as at 22, the terminal ends 23 of a series of electrical conductor cables 24 for electric current of different amperages supplied by the generator, of the arc welding machine.

A crank handle 25 of insulation material and rod form extends forwardly from the terminal loop 9 with one end threaded into one side of said loop 9 and a collar 26 fastened on the handle for bearing against the other side of the said loop, the arrangement being such that by turning the handle 25 into the terminal loop 9, the sides of said loop will be squeezed together to clampingly engage the terminal 13 of the contact bar member 10 with the tips 20 of the contact bars 18.

As will now be manifest, the selector arm 5 may be swung edgewise on the bolt 6 to adjust the terminal loop 9 into straddling relation to the tip 20 of any selected contact bar 18 so as to electrically connect the terminal 13 of the contact member 10 with the selected contact bar 18 to close circuit of a selected amperage from the conductor cable 23 connected to the selected contact bar 18 then to the welding tool over the selected contact bar 18, the contact bar 10 and the cable 17 for the tool. By turning the handle 25, the terminal loop 9 may be squeezed to clamp the terminal 13 of the contact member 10 into clamping relation to the tip 20 of the selected contact bar 18. As best shown in Figure 3, the selector arm 5 is arranged to fulcrum against the bracket bar 3 on the bolt 6 when the lock nuts 7 are tightened against said arm, so that the terminal 13 may be clamped against the tip 20 of a selected contact bar 18, this clamping being additional to the clamping exerted by turning of the handle 25 and being provided for so that constant pressure may be exerted by the terminal 13 against the tip 20 of the selected contact bar 18 to positively obviate arcing at the points of electrical connection. As will be seen, when the selector arm 5 is swung, the lower end 14 of the contact member 10 swings in the opening 2. A particular feature of the invention is that the contact bars 18 are arranged closer together than the width of the terminal 13 so that said terminal will bridge the tips 20 of adjacent contact bars 18 while being swung from one tip to another. Thus the electric circuit is not interrupted, nor the welding operation, while varying the amperage of the welding circuit.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described my invention, what is claimed as new is:

1. In a switch of the class described, a centrally apertured panel of insulation material, a series of contact bars secured to one side of said panel and having outer ends extending beyond one edge of said panel in spaced apart relation, conductor power cables for electric current of different amperage connected to the other ends of said bars opposite said side of the panel, a selector arm of insulation material having a terminal loop, means pivotally mounting said arm on the other side of said panel for swinging to move said loop into straddling relation to the outer ends of said contact bars selectively, a contact member on said arm having a terminal end extending into said loop for engagement with the outer end of the contact bar of the series straddled by said loop and having its other end extended through said aperture beyond the first mentioned side of the panel, and a power output conductor cable attached to said other end of said contact member.

2. In a switch of the class described, a centrally apertured panel of insulation material, a series of contact bars secured to one side of said panel and having outer ends extending beyond one edge of said panel in spaced apart relation, conductor power cables for electric current of different amperage connected to the other ends of said bars opposite said side of the panel, a selector arm of insulation material having a terminal loop, means pivotally mounting said arm on the other side of said panel for swinging to move said loop into straddling relation to the outer ends of said contact bars selectively, a contact member on said arm having a terminal end extending into said loop for engagement with the outer end of the contact bar of the series straddled by said loop and having its other end extended through said aperture beyond the first mentioned side of the panel, a power output conductor cable attached to said other end of said contact member, and means for clampingly engaging the terminal end of said contact member with the outer end of the contact bar of the series straddled by said loop comprising a handle on said loop for swinging said selector arm rotatable to squeeze the sides of said loop together.

3. In a switch of the class described, a centrally apertured panel of insulation material, a series of contact bars secured to one side of said panel and having outer ends extending beyond one edge of said panel in spaced apart relation, conductor power cables for electric current of different amperage connected to the other ends of said bars opposite said side of the panel, a selector arm of insulation material having a terminal loop, means pivotally mounting said arm on the other side of said panel for swinging to move said loop into straddling relation to the outer ends of said contact bars selectively, a contact member on said arm having a terminal end extending into said loop for engagement with the outer end of the contact bar of the series straddled by said loop and having its other end extended through said aperture beyond the first mentioned side of the panel, and a power output conductor cable attached to said other end of said contact member, said terminal end of the contact member being wider than the spacing between the outer ends of said contact bars for bridging adjacent outer ends of the contact bars while said selector arm is being swung to move the terminal loop out of straddling relation to one outer end into such relation to an adjacent outer end whereby to prevent interrupting the electric current during swinging of the selector arm to engage said terminal end with selected outer ends of the contact bars.

4. In a switch of the class described, a panel of insulation material, a contact bar secured to one side of the panel with an outer end extending beyond one edge of the panel, a selector arm of insulation material having a terminal loop, means pivotally mounting said arm on the other side of the panel for swinging to move said loop into straddling relation to said outer end of said bar, a contact member on said arm having a terminal extending into said loop, and means for squeezing the sides of the loop together to clampingly engage said contact member with said bar.

EARL L. HINDMAN.

REFERENCES CITED

The following references are of record in the file of this patent:

UNITED STATES PATENTS

| Number | Name | Date |
|---|---|---|
| 1,265,697 | Simmers | May 7, 1918 |
| 1,303,284 | Frank | May 13, 1919 |
| 1,649,107 | Fahnestock | Nov. 15, 1927 |